(12) United States Patent
Rathschlag et al.

(10) Patent No.: US 7,479,323 B2
(45) Date of Patent: Jan. 20, 2009

(54) ENCAPSULATED PIGMENTS

(75) Inventors: Thomas Rathschlag, Grossostheim (DE); Veronika Hochstein, Bruchsal (DE); Carsten Griessmann, Gross-Zimmern (DE); Sabine Schoen, Herten (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/949,718

(22) Filed: Sep. 27, 2004

(65) Prior Publication Data

US 2005/0069704 A1     Mar. 31, 2005

(30) Foreign Application Priority Data

Sep. 25, 2003  (DE) ................ 103 44 660

(51) Int. Cl.
    *B32B 5/16*  (2006.01)
(52) U.S. Cl. ...................... 428/403; 428/407
(58) Field of Classification Search ............ 428/403, 428/407
    See application file for complete search history.

(56) References Cited

U.S. PATENT DOCUMENTS

| | | | | |
|---|---|---|---|---|
| 3,930,101 A | * | 12/1975 | Vincent | 428/326 |
| 4,205,997 A | * | 6/1980 | Hesse et al. | 524/548 |
| 4,295,850 A | | 10/1981 | Haeberli et al. | |
| 4,525,170 A | | 6/1985 | Balliello | |
| 4,565,764 A | * | 1/1986 | Nakahara et al. | 430/110.2 |
| 4,624,678 A | | 11/1986 | Schneider | |
| 4,729,796 A | * | 3/1988 | Deubel et al. | 106/413 |
| 4,846,893 A | * | 7/1989 | Akasaki et al. | 106/500 |
| 4,961,755 A | | 10/1990 | Bruttel et al. | |
| 5,454,864 A | * | 10/1995 | Whalen-Shaw | 106/416 |
| 5,681,876 A | | 10/1997 | Schneider et al. | |
| 6,010,790 A | * | 1/2000 | Chen et al. | 428/411.1 |
| 6,033,839 A | * | 3/2000 | Smith et al. | 430/496 |
| 6,521,342 B1 | * | 2/2003 | Hutter et al. | 428/407 |
| 6,547,870 B1 | * | 4/2003 | Griessmann et al. | 106/417 |

FOREIGN PATENT DOCUMENTS

GB     1408842     10/1975

* cited by examiner

*Primary Examiner*—H. T Le
(74) *Attorney, Agent, or Firm*—Millen, White, Zelano, Branigan, P.C.

(57) ABSTRACT

Described are encapsulated pigments having an outer water-soluble shell and a core containing organic and/or inorganic pigments and optionally solvents and/or conventional additives. The encapsulated pigments have very good dissolution rates in aqueous systems and are therefore particularly suitable for paints, coatings, printing inks, in papermaking and in cosmetic formulations.

16 Claims, No Drawings

ENCAPSULATED PIGMENTS

The present invention relates to encapsulated pigments including an outer water-soluble shell and a core comprising organic and/or inorganic pigments and optionally conventional additives. Pigments of this type are distinguished by their very good dissolution rates in aqueous systems and are therefore particularly suitable for paints, coatings, water-borne printing inks, in papermaking and in the pigmentation of water-containing cosmetic formulations.

The granules comprising pigments and binders which are known from the prior art generally have the disadvantage of having comparatively low solubility in aqueous systems or exhibiting difficulties during dispersal. For the homogenization of, for example, effect pigments based on flake-form substrates from the granules in the formulation to be prepared, mechanical forces are necessary, which can in turn destroy the flakes of the effect pigments, which in turn has an adverse effect on the optical properties of the pigments.

An object of the present invention is to provide pigment compositions in the form of solid particle forms which do not have the above-mentioned disadvantages and have a significantly higher dissolution rate in aqueous binder systems than the granules from the prior art.

Upon further study of the specification and appended claims, further objects and advantages of this invention will become apparent to those skilled in the art.

Surprisingly, it has been found that the homogenization of pigments in aqueous application systems, such as, for example, in printing inks, surface coatings or in cosmetic formulations, can be significantly increased if the pigments are encapsulated with a water-soluble film.

The invention therefore includes encapsulated pigments having an outer water-soluble shell and a core comprising organic or inorganic pigments and optionally solvents and/or conventional additives.

The encapsulated pigments according to the invention are preferably distinguished in that the shell generally dissolves within one minute [10 g of pigment granules in 90 g de-ionized water at room temperature with stirring at 300 rpm] and the pigments are in free form and can easily be distributed into the binder system, simplifying later homogenization of the formulation to be prepared since lower mechanical forces are necessary for dissolution of the encapsulated pigments.

The encapsulated pigments according to the invention are preferably non-dusting, free-flowing, can be incorporated into commercially available aqueous binder systems significantly more quickly than the granules from the prior art and are compatible therein. In particular, the products are compatible both with water-borne printing-ink and surface-coating systems and in water-based cosmetic formulations and in papermaking. The paints and coatings prepared via the granules are suitable for all water-borne printing inks, for example for gravure printing, flexographic printing, screen printing, offset overprint varnishing and for the various water-borne coating systems from the industrial coatings and automotive paints sector. They are also suitable for the coloring of plastics in biodegradable films.

The encapsulated pigments according to the invention preferably comprise ≧80% by weight, more preferably ≧90% by weight, and in particular ≧95% by weight, of pigments. Very particular preference is given to encapsulated pigments having a pigment content of greater than 95% by weight. The % by weight data are always based on the encapsulated pigment. The shell/core weight ratio is preferably from 50:50 to 0.5:99.5, in particular from 10:90 to 5:95.

The encapsulated pigments according to the invention comprise a water-soluble film former for the encapsulation. Suitable film formers are, for example, water-soluble resins or resin mixtures, cellulose and cellulose derivatives, such as, for example, alkylcellulose, hydroxycellulose, hydroxyalkylcellulose, cellulose acetobutyrate (water-dispersible form), cellulose nitrate (water-dispersible form), sugars, sorbitol, starch, alginates and/or chitosan. The encapsulated pigments have an outer shell having film thicknesses of preferably 0.01-1 mm, more preferably of 0.01-0.5 mm and in particular of 0.01-0.1 mm.

The acid number of the film former based on a water-soluble resin or resin mixture is preferably from 90 to 350 mg of KOH/g, in particular from 120 to 280 mg of KOH/g and very particularly preferably from 150 to 270 mg of KOH/g.

Some exemplary characteristic values of suitable water-soluble resins are given below:

Polyvinyl Alcohols
 Ester value in accordance with DIN 53401 in mg of KOH/g=1-250
Degree of hydrolysis in mol %=80-100
Viscosity in accordance with DIN 53015 in mPas=2-60
Residual acetyl content=0.1-20
Ash content in %, calculated as $Na_2O$=0.5-1
 Polyvinylpyrrolidones (PVP)
K values=15-103
Ash content in %=<0.02
 Molecular weight (GPC):
Mw/kdaltons=7-2000
Relative viscosity measured in a capillary viscometer=1.08-16.2 (1% in water, 23° C.)
Glass transition temperature ° C./DSC=110-180
 Copolymer of polyvinylpyrrolidone with vinyl acetate
Composition vinylpyrrolidone:vinyl acetate: 30:70-70:30
K values=20-40
 Na carboxymethylcellulose
Viscosity (2% solution in water, measured by means of a Brookfield LVT viscometer in mPas)=2-100,000
Microcrystalline cellulose
Average particle size: 50-180 μm All natural, semisynthetic and fully synthetic water-soluble film-forming resins or resin mixtures known to the person skilled in the art in which organic or inorganic pigments are usually employed are suitable as the film former for encapsulation. Particularly preferred resins are polyvinyl alcohol (PVA) (PVOH), polyvinylpyrrolidone (PVP), copolymers of polyvinylpyrrolidone with vinyl acetate, microcrystalline cellulose, sodium carboxymethylcellulose (Na-CMC).

Particular preference is given to polyvinyl alcohol owing to its very good dissolution rate. Suitable resins are, for example, commercially available from Kuraray under the name Mowiol™.

The core of the encapsulated pigments consists of organic and/or inorganic pigments and optionally additives, solvents and binders.

Suitable inorganic pigments are, in particular, effect pigments, $SiO_2$ pigments and $TiO_2$ pigments.

The term effect pigments here is taken to mean, in particular, pearlescent pigments, metal-effect pigments, multilayered pigments, holographic pigments, coated or uncoated BiOCl flakes and LCP (liquid crystal polymer) pigments. The BiOCl pigments can also be employed in the form of pastes.

Particular preference is given to encapsulated pigments comprising pearlescent pigments based on flake-form, transparent or semi-transparent substrates. Suitable substrates are, for example, phyllo-silicates, such as, for example, natural or synthetic mica or other silicate materials, talc, sericite, kaolin, and $SiO_2$ flakes, glass flakes, $TiO_2$ flakes, graphite flakes or $Al_2O_3$ flakes. The flake-form substrates are coated, for example, with rare-earth metal sulfides, such as, for example, $Ce_2S_3$, titanium suboxides, titanium oxynitrides, pseudobrookite, with colored or colorless metal oxides, such as, for example, $TiO_2$ (rutile or anatase), $Fe_2O_3$, $Fe_3O_4$, $SnO_2$, $ZrO_2$, $SiO_2$, $Al_2O_3$, $Cr_2O_3$, ZnO, CuO, NiO, $Ce_2O_3$ and other metal oxides, alone or in a mixture, in a single layer or in successive layers (multilayered pigments).

Pearlescent pigments are known, for example, from the German Patents and Patent Applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and P 38 42 330 and are commercially available, for example under the names Iriodin®, Afflair®, Xirona® from Merck KGaA, Darmstadt, Germany. Multilayered pigments based on mica are marketed, for example, by Merck KGaA, EM Industries or Rona under the names Timiron® Splendid Copper, Timiron® Splendid Gold, Timiron® Splendid Green, Timiron® Splendid Violet, Timiron® Splendid Blue, Timiron® Splendid Red, Iriodin® Solargold, Dichrona® Splendid BY, Dichrona® Splendid BR, Xirona® Caribbean Blue. Particular preference is given to multilayered pigments having a $TiO_2$—$SiO_2$—$TiO_2$ layer sequence. Multilayered pigments may optionally also have a colorant, such as, for example, Berlin Blue, Carmine Red, iron oxide or Chromium Green, on the surface.

Particularly preferred encapsulated pigments comprise $TiO_2$—, $Fe_2O_3$— or $TiO_2/Fe_2O_3$-coated mica flakes, glass flakes, $Al_2O_3$ flakes, $Fe_2O_3$ flakes or $SiO_2$ flakes, in the pigment core. The $SiO_2$ flakes can be coated, for example, as described in WO 93/08237 (wet-chemical coating) or DE-A 196 14 637 (CVD process). $Al_2O_3$ flakes are known, for example, from EP 0 763 573 A1. Flake-form substrates which are coated with one or more rare-earth metal sulfides are disclosed, for example, in DE-A 198 10 317. Mono- or multicoated pigments based on glass flakes are known, for example, from the Patent Applications WO 03/006558 A2, WO 02/090448 A2 and WO 2004/055119 A1.

Also suitable are metal-effect pigments, in particular aluminum flakes modified for water-borne and solvent-containing systems, as marketed by Eckart under the name Rotovario Aqua® or Stapa Hydroxal® for aqueous applications, and Variocrom®, Paliocrom® pigments and Sicopearl Fantastico pigments from BASF, in particular also those from EP 0 681 009 A1, EP 0 632 110 A1, EP 0 634 458 A1, and LCP (liquid crystal polymer) pigments. Suitable effect pigments from BASF are, for example, Variocrom ED 1478, Variocrom ED 1479, Variocrom ED 1480. Also suitable are likewise all holographic pigments and flake-form pigments known to the person skilled in the art which have metal layers. Pigments of this type are marketed, inter alia, by Flex, for example under the names Chromaflair® Red/Gold 000, Chromaflair® Gold/Silver 080, Chromaflair® Green/Purple 190, Chromaflair® Silver/Green 060. The Chromaflair® pigments having a particle size of about 11-13 μm consist of an opaque aluminum core and a magnesium fluoride layer of varying layer thickness which produces the later interference color of the pigment to be obtained. As outermost layer, a semi-transparent chromium layer can also be applied.

Interference pigments consisting of mica and titanium dioxide which are furthermore suitable are, for example, Flamenco® Summit Colors from Engelhard having a particle size of 6-48 μm and Reflecks™ pearlescent and iridescent pigments having a particle size of 4-190 μm consisting of borosilicate and titanium dioxide and/or iron oxide.

Suitable silver and interference pigments based on mica and titanium dioxide and/or iron oxide in various particle sizes are marketed under the name Prestige® by Eckart. Also suitable are metallic pigments for cosmetic purposes from Eckart, which are marketed under the name Visionaire®. They consist of aluminum, bronze or copper powders which are encapsulated with silicon dioxide and are available in particle sizes $d_{50}$=17, 20 or 35 μm.

The encapsulated pigments according to the invention can comprise one or more pigments. Through the use of at least two different effect pigments, particular color and luster effects can frequently be achieved. Preferred encapsulated pigments consist of a pigment mixture and comprise one or two, furthermore three effect pigments, in particular those based on mica flakes, glass flakes, $Al_2O_3$ flakes, $Fe_2O_3$ flakes and/or $SiO_2$ flakes. Preference is furthermore given to pigment mixtures which are based on different particle sizes, for example mixtures of mica flakes from the N fraction (10-60 μm) and F fraction (5-25 μm) which are coated with one or more metal oxides. Blends of the effect pigments with organic and inorganic pigments in amounts of up to 10% by weight, based on the encapsulated pigment, are also possible, where the total amount of pigment should not exceed 95% by weight, based on the encapsulated pigment. The blending enables color flops to be set very specifically. In particular, the addition of one or more dyes and/or organic pigments in ground form results in specific color effects. It is furthermore possible to add substances and particles (tracers) which enable product identification.

The encapsulated pigments according to the invention may optionally comprise solvents or solvent mixtures, in general a maximum of 10% by weight, based on the encapsulated pigment. The encapsulated pigments preferably comprise 1.5-7.5% by weight, in particular 3.0-7.5% by weight and very particularly preferably 3.0-5.0% by weight, of solvent. The optional solvent component in the encapsulated pigment when used, should in each case be correctly matched to the resin system used. During the preparation, water and all water-miscible organic non-volatile solvents can be employed. Suitable solvents are, for example, water, glycol ethers, such as, for example, propylene glycol monoethyl ether, propylene glycol monoethyl ether, or diols, such as, for example, ethylene glycol and propylene glycol, or polyether diols, aliphatic triols and tetrols having from 2 to 6 carbon atoms, such as trimethylolethane, trimethylolpropane, glycerol, 1,2,4-butanetriol, 1,2,6-hexanetriol, alcohols, ketones, esters, and all other solvents from other classes of compound or a mixture of two or three of the above-mentioned solvents.

Particular preference is given to solvents having a boiling point of >35° C., in particular >70° C. Preference is given to the use of solvents of medium or high viscosity. It is preferred that the solvent component in the preparation comprises at least one solvent or solvent mixture which has a vapor pressure at 20° C. of from 0.001 to 40 hPa, preferably from 0.001 to 30 hPa.

Particularly preferred solvents are water, polyalkylene glycol, glycol ethers, diols, aliphatic triols having 2-6 carbon atoms, glycerol, 1,2,4-butanetriol, 1,2,6-hexanetriol or a mixture of two or three of the said solvents. The vapour pressures of the suitable solvents can easily be determined by the person skilled in the art or looked up in the Handbook of Chemistry and Physics, $71^{st}$ Edition 1990-1991, David R. Lide, CRC-Press, Chapter 6-48.

Particular preference is given to polyalkylene glycols, 1,2-ethanediol (0.053 hPa), 1,2,3-hexanetriol (0.01 hPa), 1,2,3- propanetriol (0.001 hPa) and water (23 hPa). Sorbitol and/or urea may also be dissolved in the water. Preferred polyalkylene glycols are polyethylene glycol (0.1 hPa) and ethylene glycol monobutyl ether (0.8 hPa) (vapour pressures at 20° C. in each case indicated in brackets from Handbook of Chemistry and Physics).

Besides the pigment and the film former, the encapsulated pigments can comprise, both in the core and in the outer shell, conventional additives, such as, for example, neutralizers, antifoams, wetting agents, UV stabilizers, preservatives, antisettling agents, flow-control agents, emulsifiers, siccatives or thixotropic agents. These are conventional assistants in the surface coatings and printing industries and in cosmetic formulations which may be present in the encapsulated pigments according to the invention in an amount of from 0 to 10% by weight. In particular, mention may be made here of succinate derivatives, for example those as marketed by Henkel under the name Hydropalat 875™.

If the encapsulated pigments comprise a neutralizer as additional component, this is, in particular, one of the usual bases in the surface-coatings sector, such as, for example, urea, urea derivatives, ammonia, amino alcohols, such as, for example, 2-amino-2-methyl-1-propanol, alkali metal hydroxides, such as, for example, KOH or NaOH, or amines, which, in encapsulated pigments for aqueous applications, are preferably non-volatile organic low-molecular-weight amines or those which have low volatility at room temperature.

Preferably, the encapsulated pigment according to the invention comprises from 0.05 to 10% by weight of a neutralizer, more preferably from 1 to 7% by weight, in particular from 1.5 to 5% by weight, based on the total weight of the encapsulated pigment.

The encapsulated pigments according to the invention may furthermore comprise a modifier as a further component in amounts of from 0.05 to 10% by weight, preferably from 0.05 to 6% by weight, in particular from 0.05 to 3% by weight. In particular, the modifier employed is a polyalkylene oxide or a polyalkylene oxide derivative in order to improve the strength of the encapsulated pigments and the compatibility.

If necessary, the addition of a redispersant in the form of bulky particles, such as, for example, fibers or spherical particles, prevents the effect pigments based on flake-form substrates from laying one on top of the other to a significant extent owing to steric repulsion and thus exerting strong adhesion. This has the effect that the encapsulated pigments according to the invention are more stable and some of the encapsulated pigments settle very much more slowly after introduction into the surface-coating, printing-ink or color system or into the cosmetic formulation, but the sediment is in all cases less hard, and that no problems occur on stirring-up the base sediment again.

The redispersant is preferably employed in amounts of from 0 to 5% by weight, in particular from 0.05 to 3% by weight, based on the granules. All organic and inorganic fibers having a fiber length of 0.1-20 μm which are known to the person skilled in the art can be used. Suitable particles are, in particular, all synthetic fibers, for example made from polyethylene, polyacrylates, polypropylene, polyamides, cellulose fibers, inorganic fibers, here preferably silicon compounds, glass fibers and in particular products of the condenzation of modified isocyanates and mono- and diamines. These condenzation products, which are diurea derivatives as well as aminoureas containing urethane groups, are known as thixotropic agents and are added to paints and coatings with a binder in order to improve the flow properties and spreadability.

Furthermore, redispersants which can be used are all diurea derivatives and urethane compounds known to the person skilled in the art, as described, for example, in EP 0 198 519 and in Organic Coatings: Science and Technology, A. Heenriga, P. J. G. von Hemsbergen, pp. 201-222, New York 1983.

Suitable spherical materials are, in particular; hollow glass, wax or polymer beads made from vinyl resins, nylon, silicone, epoxy resins, olefin resins, polystyrenes and inorganic materials, such as, for example, $TiO_2$, $SiO_2$ or $ZrO_2$. Preference is given to the use of hollow beads, furthermore also solid beads, having a particle size of from 0.05 to 150 μm. Particular preference is given to the use of hollow glass, wax or polymer beads in the encapsulated pigments according to the invention.

Spherical particles based on $SiO_2$ in a particle range of 3-10 μm are known, for example, as materials for high-pressure liquid chromatography and are marketed, for example, as LiChrospher® by Merck KGaA, Darmstadt, FRG. Such materials are preferably employed in monodisperse form, i.e. having a very uniform particle size. Monodisperse spherical particles of this type based on $SiO_2$, $TiO_2$ and $ZrO_2$ are known. Monodisperse $SiO_2$ can be prepared, for example, in accordance with EP 0 216 278 B1. Hollow glass beads are marketed, for example, under the trade name Q-CEL™ by PQ Corporation, USA, or Scotchlite™ by 3M, Frankfurt, Germany.

In addition, the encapsulated pigments according to the invention may comprise surface-active substances, such as, for example, alkylsilanes, which may also contain a further functional group, unsaturated or saturated fatty acids or fluorosurfactants. Particular preference is given to the use of silane compounds of the formula $(C_nH_{2n+1})Si(OC_mH_{2m+1})_3$, in which n is 1-30 and m is 1-10, as surface-active substances. Suitable silane compounds are, for example, n-hexyldecyltriethoxysilane and n-octyldecyltriethoxysilane (Si 116 and Si 118 respectively from Degussa AG, Frankfurt) and the corresponding fluoroalkylsilanes.

Furthermore, the surface-active substances employed can be saturated and unsaturated fatty acids, such as, for example, caproic acid, caprylic acid, capric acid, lauric acid, myristic acid, palmitic acid, stearic acid, oleic acid, linoleic acid and fatty acid mixtures.

The surface-active reagent can also be a mixture of silane, fatty acids and/or surfactants. The encapsulated pigments can comprise from 0.1 to 5% by weight, preferably from 0.2 to 3% by weight and in particular from 0.5 to 2% by weight, of surface-active substances, based on the encapsulated pigment.

Encapsulated titanium dioxide pigments preferably comprise UV A/B protective filters, such as, for example, phenylbenzimidazole-5-sulfonic acid (Eusolex® 232), benzophenone 5-sodium salt (Uvinul MS 40™ (BASF)), terephthalylidenedicamphorsulfonic acid (Mexoryl SX™ (Chimex)), benzylidenecamphorsulfonic acid (Mexoryl SL™ (Chimex)), disodium phenyldibenzimidazoletetrasulfonate (Neoheliopan AP™ (Symrise)) and aqueous titanium dioxide dispersions (Eusolex® T-aqua), in the film former.

In the preparation of the encapsulated pigments, the pigments, the film former and the additives, if present, are mixed, if desired with addition of a solvent, preferably water. The proportion of solvent at the beginning of the preparation is preferably between 20 and 40% by weight, more preferably between 25 and 35% by weight. During the preparation of the encapsulated pigments, the film former and any further additives are preferably pre-mixed with the solvent before they are added to the pigment. Intensive contact between pigment and film former is preferred in order to ensure more uniform coverage of the pigment surface. This mixture is subsequently homogenized under gentle conditions.

The pigment is preferably initially introduced and firstly slurried with stirring with the solvent containing the film former and, if desired, the modifier; a further solution consisting of solvent and additives is subsequently added.

In order to prepare the encapsulated pigments, the moist pigment preparation is extruded or compressed into a compact particle form by other methods known to the person skilled in the art, for example by tableting, briquetting, pelleting, granulation, spray granulation, fluidized-bed granulation or extrusion, and subsequently dried under precisely controlled conditions. During the drying operation, the solvent content of the granules is determined continuously. The drying process is carried out at temperatures preferably of from 80 to 130° C., more preferably from 100 to 120° C., and can, if desired, be carried out under reduced pressure, preferably at 80-100 mbar. During this process, the film former, such as, for example, polyvinyl alcohol, is formed into a film by specific exposure to heat. The drying duration depends on the batch size of the preparation to be dried, its throughput during drying and on the solvent used, but is generally 0.5-24 hours, preferably 1-18 hours. Finally, the encapsulated pigment is classified if desired.

The term "encapsulated pigments" here is taken to mean all possible solid particle forms, such as, for example, granules, pellets, chips, briquettes, tablets, sausages, etc. The particle sizes of the encapsulated pigments are in the range preferably from 0.1 to 150 mm, more preferably from 0.1 to 20 mm, in particular from 0.1 to 6 mm.

If the encapsulated pigments are to have a residual moisture content, the solvent content is determined during preparation by determining the residual moisture content using an infrared-based moisture analyzer, model MA 30 from Sartorius. The water content is determined here after prior calibration. If further solubility enhancers are to be determined, this is carried out by the principle of differential weighing, since the substances to be analyzed can be expelled together with the water from a previously calibrated temperature. Only the polymeric substance/resin fraction and the effect pigment remain.

During determination of the water content using the moisture analyzer, model MA 30 from Sartorius, the following parameters can be selected for finding the result:
Sample weight: 4-5 g of unground test substance
Temperature: 135-160° C.
Time setting: 12-20 minutes
Results display: 0-100% (solvent content).

The encapsulated pigments according to the invention can be used for a wide variety of applications. They are preferably employed in water-borne coating systems from the areas of printing, in particular overprint varnishing, offset overprint varnishing, gravure printing, flexographic printing and screen printing. The encapsulated pigments are particularly preferably applied as precursors for coating compositions to any desired substrate materials, for example metals, such as iron, steel, aluminum, copper, bronze, plastic, brass, and metal foils, but also glass, ceramic and concrete, and to wood, for example furniture, clay, textile, paper, packaging materials, for example plastic containers, films or cardboard, or to other materials for decorative and/or protective purposes. The encapsulated pigments according to the invention are furthermore suitable in formulations for the production of security features.

Owing to their good homogenization, the encapsulated pigments are particularly suitable for cosmetic formulations, both in the area of decorative cosmetics and for personal care products. If encapsulated pigments are used with effect pigments, particularly effective effects can be achieved therewith in the various aqueous application media, for example in cosmetic formulations, such as, for example, shower gel, make-up, gel products, lotions, shampoos and emulsions.

The encapsulated pigments according to the invention can of course also be combined in the formulations with cosmetic raw materials and assistants of any type. These include, inter alia, oils, fats, waxes, film formers, preservatives, such as, for example, methylparaben, and assistants which generally determine applicational properties, such as, for example, thickeners and rheological additives, such as, for example, bentonites, hectorites, silicon dioxides, Ca silicates, gelatine, high-molecular-weight carbohydrates and/or surface-active assistants, etc. The formulations comprising the pigments according to the invention can belong to the lipophilic, hydrophilic or hydrophobic type. In the case of heterogeneous formulations having discrete aqueous and non-aqueous phases, the encapsulated pigments according to the invention may in each case be present in only one of the two phases or alternatively distributed over both phases.

The pH values of the formulations can be between 1 and 14, preferably between 2 and 11 and particularly preferably between 5 and 8.

No limits are set for the concentrations of the encapsulated pigments according to the invention in the formulation. They can be—depending on the application—between 0.001 (rinse-off products, for example shower gels) and 100% (for example luster-effect articles for particular applications).

The encapsulated pigments according to the invention may furthermore also be combined with cosmetic active ingredients.

Suitable active ingredients are, for example, insect repellents, inorganic UV filters, such as, for example, $TiO_2$, UV A/B/C protective filters (for example OMC, B3 and MBC), also in encapsulated form, anti-ageing active ingredients, vitamins and derivatives thereof (for example vitamin A, C, E, etc.), self-tanning agents (for example DHA, erythrulose, inter alia), and further cosmetic active ingredients, such as, for example, bisabolol, LPO, VTA, ectoin, emblica, allantoin, bioflavonoids and derivatives thereof.

Organic UV filters are preferably incorporated into cosmetic formulations in an amount of from 0.5 to 10 percent by weight, were preferably 1-8%, and inorganic filters in an amount of from 0.1 to 30%.

The compositions according to the invention may in addition comprise further conventional substances which are hydrating and/or effective for skin care, such as, for example, aloe vera, avocado oil, coenzyme Q10, green tea extract or active-ingredient complexes. Particularly preferred active ingredients are pyrimidinecarboxylic acids and/or aryl oximes. Of the cosmetic applications, particular mention may be made of the use of ectoin and ectoin derivatives for the care of aged, dry or irritated skin.

Suitable application forms of the cosmetic formulations which may be mentioned are, in particular: solutions, suspensions, emulsions, PIT emulsions, pastes, ointments, gels, creams, lotions, surfactant-containing cleansing preparations, aerosols and sprays. Examples of other application forms are shampoos and shower preparations. Any desired customary carriers, assistants and, if desired, further active ingredients may be added to the composition.

Ointments, pastes, creams and gels may comprise the customary excipients, for example animal and vegetable fats, waxes, paraffins, starch, tragacanth, cellulose derivatives, polyethylene glycols, silicones, bentonites, silica, talc and zinc oxide, or mixtures of these substances.

Sprays may comprise the customary excipients, for example lactose, talc, silica, aluminum hydroxide, calcium silicate and polyamide powder, or mixtures of these substances. Sprays may additionally comprise the customary propellants, such as, for example, chlorofluorocarbons, propane/butane or dimethyl ether.

Solutions and emulsions may comprise the customary excipients, such as, for example, solvents, solubilizers and emulsifiers, for example water, ethanol, isopropanol, ethyl carbonate, ethyl acetate, benzyl alcohol, benzyl benzoate, propylene glycol, 1,3-butyl glycol, oils, in particular triglycerides, fatty alcohols, cottonseed oil, peanut oil, wheatgerm oil, olive oil, castor oil and sesame oil, glycerol fatty acid esters, polyethylene glycols and fatty acid esters of sorbitan, or mixtures of these substances. Suspensions, furthermore also emulsions and solutions, may comprise the customary excipients, such as liquid diluents, for example water, ethanol or propylene glycol, suspending agents, for example ethoxylated isostearyl alcohols, polyoxyethylene sorbitol esters and polyoxyethylene sorbitan esters, microcrystalline cellulose, hydroxyethylcellulose, aluminum metahydroxide, bentonite, hectorite, agar-agar and tragacanth, or mixtures of these substances.

Surfactant-containing cleansing products may comprise the customary active substances, such as salts of fatty alcohol sulfates, fatty alcohol ether sulfates, sulfosuccinic acid monoesters, fatty acid protein hydrolysates, isethionates, imidazolinium derivatives, methyl taurates, sarcosinates, saccharose esters, alkylpolyglycosides, fatty acid taurides, fatty acid glutamates, phosphoric acid esters, fatty acid amide ether sulfates, alkylamidobetaines, fatty alcohols, fatty acid glycerides, fatty acid diethanolamides, and in addition vegetable and synthetic oils, lanolin derivatives, ethoxylated glycerol fatty acid esters, or mixtures of these substances.

Face and body oils may comprise the customary carriers, such as synthetic oils, such as, for example, fatty acid esters, fatty alcohols, silicone oils, natural oils, such as vegetable oils and oily plant extracts, paraffin oils, lanolin oils, or mixtures of these substances, and in addition stabilizers, such as, for example, ethoxylated isostearyl alcohols, polyoxyethylene sorbitol esters and polyoxyethylene sorbitan esters, microcrystalline cellulose, hydroxyethylcellulose, aluminum metahydroxide, bentonite, hectorite, agar-agar and tragacanth, or mixtures of these substances.

The cosmetic compositions may exist in various forms. Thus, they can be, for example, a solution, an emulsion or microemulsion of the water-in-oil (W/O) or oil-in-water (O/W) type, a multiple emulsion, for example of the water-in-oil-in-water (W/O/W) type, a gel, an ointment or an aerosol. It is also advantageous to administer ectoins in encapsulated form, for example in collagen matrices and other conventional encapsulation materials, for example as cellulose encapsulations, in gelatine, wax matrices or liposomally encapsulated. In particular, wax matrices, as described in DE-A 43 08 282, have proven favorable. Preference is given to emulsions. O/W emulsions are particularly preferred. Emulsions, W/O emulsions and O/W emulsions are obtainable in a conventional manner.

If a composition is formulated as an aerosol, the customary propellants, such as alkanes, fluoroalkanes and chlorofluoroalkanes, are generally used.

The cosmetic composition may also be used to protect the hair against photochemical damage in order to prevent color changes, bleaching or damage of a mechanical nature. In this case, a suitable formulation is in the form of a rinse-out shampoo, lotion, gel or emulsion, the composition in question being applied before or after shampooing, before or after coloring or bleaching or before or after permanent waving. It is also possible to select a composition in the form of a lotion or gel for styling or treating the hair, in the form of a lotion or gel for brushing or blow-waving, in the form of a hair lacquer, permanent waving composition, colorant or bleach for the hair. The composition having light-protection properties may comprise adjuvants, such as surfactants, thickeners, polymers, softeners, preservatives, foam stabilizers, electrolytes, organic solvents, silicone derivatives, oils, waxes, antigrease agents, dyes and/or pigments which color the composition itself or the hair, or other ingredients usually used for hair care.

The invention thus also relates to the use of the encapsulated pigments according to the invention in aqueous formulations, such as paints, printing inks, security printing inks, coating compositions, surface coatings, such as, for example, industrial coatings and automotive paints, in plastics and in cosmetics.

The entire disclosures of all applications, patents and publications, cited herein and of corresponding German application No. 103 44 660.5, filed Sep. 25, 2003 is incorporated by reference herein.

EXAMPLES

The preceding examples can be repeated with similar success by substituting the generically or specifically described reactants and/or operating conditions of this invention for those used in the preceding examples.

Example 1

1.1 Preparation of the Granulation Solution 800.0 g of deionized water are introduced into a 2000 ml jacketed vessel at room temperature. 200 g of Mowiol™ 6-88 granulation resin (polyvinyl alcohol, fully hydrolysed, Kuraray) are then introduced by means of a 4-paddle stirrer at 300 rpm. The jacket is subsequently heated to 90-95° C. using superheated steam, and the mixture is stirred until the granulation resin has completely dissolved. Finally, the superheated steam is switched off, and the granulation resin solution is stirred further until it has cooled to 30-40° C.

1.2 Preparation of the Encapsulated Pigment

For the preparation of the encapsulated pigments, good mixing must be ensured. The mixture is prepared on a 1 kg scale with the aid of an Eirich R02 mixer. To this end, 666.7 g of Iriodin® 100 (TiO$_2$/mica pigment having a particle size of 10-60 μm, Merck KGaA) are introduced into the mixer tank, and 85.3 g of granulation solution from Example 1.1 are slowly added. 248 g of deionized water are subsequently added, and the mixture is homogenized. The vessel walls, the vessel base and scraper are then freed from deposits using a dough scraper, and the mixture is subsequently mixed for a further 1-5 minutes. The finished granule mixture should be free from relatively large aggregates and have a crumb-like consistency.

1.3 Pelleting of the Encapsulated Pigment

In order to obtain the coarse and irregular encapsulated pigments in dry form as free-flowing and low-abrasion pellets, the moist material is pelleted in an Eirich TR 04 disc pelleter. The size distribution is also set therein.

To this end, 200 g of freshly prepared granules are placed on the disc, and the target particle size is set at 200-350 rpm and an inclination angle of 30-40°. Portions of between 50 and 100 g are introduced, which can be added within a short time.

Relatively coarse aggregates collect in the center of the "material-flow kidney" formed during pelleting. These are picked up using a small shovel, comminuted manually and added again.

1.4 Drying of the Pellets

The pellets are dried in an Aeromatic Fielder, model STREA fluidized-bed dryer. The drying time for 1.7 kg of moist material is 90-120 minutes. The drying commences when water no longer condenses on the upper vessel wall/feed air→110° C. (exhaust air about 35-45° C.). Complete drying is subsequently carried out with a feed air of 100-110° C. (exhaust air 90-100° C.). Depending on the pellet size and moisture content, the feed-air strength has to be regulated. The moist granulated mixture is adjusted to a residual moisture content of at least 3% by weight.

1.5 Fractionation of the Dried Pellets

In order to separate coarse particles and fines from the product particles, the dried and cooled pellets are passed firstly through a coarse sieve (upper particle limit, here 1.6 mm), and the dust and fines are subsequently separated off via a fine sieve (lower particle limit, here 0.4 mm). The yield is indicated in percent by weight (based on the amount employed).

The encapsulated pigments in the form of small beads (granules) are abrasion-resistant, dimensionally stable and compatible as well as readily soluble in the water-borne offset overprint varnish 350081 from Weilburger Lackfabrik.

1.6 Dissolution Rate 10 g of the dried and classified granules dissolve in 90 g of deionized water with stirring at 300 rpm in <60 seconds.

Example 2

2.1 Preparation of the Granulation Solution 800.0 g of deionized water are introduced into a 2000 ml jacketed vessel at room temperature. 200 g of Mowiol™ 4-88 granulation resin (polyvinyl alcohol, fully hydrolysed, Kuraray) are then introduced by means of a 4-paddle stirrer at 300 rpm. The jacket is then heated to 90-95° C. using superheated steam, and the mixture is stirred until the granulation resin has completely dissolved. Finally, the superheated steam is switched off, and the granulation resin solution is stirred further at 300-400 rpm until it has cooled to 30-40° C.

2.2 Preparation of the Encapsulated Pigment

For the preparation of the encapsulated pigments, good mixing must be ensured. The mixture is prepared on a 1 kg scale with the aid of an Eirich R02 mixer. To this end, 614.3 g of Chromaflair® Silver/Green 060 (effect pigment from Flex) are introduced into the mixer tank, and 85.3 g of granulation solution from Example 2.1 are slowly added. 275 g of deionized water are subsequently added, and the mixture is homogenized. The vessel walls, the vessel base and scraper are then freed from deposits using a dough scraper, and the mixture is subsequently mixed for a further 1-5 minutes. The finished granule mixture should be free from relatively large aggregates and have a crumb-like consistency.

2.3 Pelleting of the Encapsulated Pigment

In order to obtain the coarse and irregular encapsulated pigments in dry form as free-flowing and low-abrasion pellets, the moist material is pelleted in an Eirich TR 04 disc pelleter. The size distribution is also set therein.

To this end, 200 g of freshly prepared granules are placed on the disc and the target particle size is set at 200-350 rpm and an inclination angle of 30-40°. When the target particle size has been established, introduction of the encapsulated pigment in portions is commenced.

Portions of between 50 and 100 g are introduced, which can be added within a short time (1 kg about 10-15 minutes). Relatively coarse aggregates collect in the center of the "material-flow kidney" formed during pelleting. These are picked up using a small shovel, comminuted manually and added again.

2.4 Drying of the Pellets

The pellets are dried in an Aeromatic Fielder, model STREA fluidized-bed dryer.

The drying time for 1.7 kg of moist material is 90-120 minutes. The drying commences when water no longer condenses on the upper vessel wall/feed air→110° C. (exhaust air about 35-45° C.). Complete drying is subsequently carried out with a feed air of 100-110° C. (exhaust air 90-100° C.). Depending on the pellet size and moisture content, the feed-air strength has to be regulated. The moist granulated mixture is adjusted to a residual moisture content of at least 3% by weight.

2.5 Fractionation of the Dried Pellets

In order to separate coarse particles and fines from the product particles, the dried and cooled pellets are passed firstly through a coarse sieve (upper particle limit, here 1.6 mm), and the dust and fines are subsequently separated off via a fine sieve (lower particle limit, here 0.4 mm). The yield is indicated in percent by weight (based on the amount employed).

The granules obtained are abrasion-resistant, dimensionally stable and compatible as well as readily soluble in the water-borne offset overprint varnish 350081 from Weilburger Lackfabrik.

2.6 Dissolution Rate 10 g of the dried and classified granules dissolve in 90 g of deionized water with stirring at 300 rpm in <60 seconds.

Example 3

3.1 Preparation of the Encapsulated Pigment

For the preparation of the encapsulated pigment, good mixing must be ensured. The mixture is prepared on a 1 kg scale with the aid of an Eirich R02 mixer. 500 g of Eusolex-2000 (UV filter from Merck, Darmstadt) are introduced into the mixer tank, and 21 g of granulation solution from Example 2.1 are slowly added. 90 g of polyethylene glycol 2000 (Merck) are separately dissolved in 240 g of deionized water with stirring and added to the Eusolex solution, and the mixture is homogenized. The vessel walls, the vessel base and scraper are then freed from deposits using a dough scraper, and the mixture is subsequently mixed for a further 1-5 minutes. The finished granule mixture should be free from relatively large aggregates and have a crumb-like consistency.

3.2 Pelleting of the Encapsulated Pigment

In order to obtain the coarse and irregular encapsulated pigments in dry form as free-flowing and low-abrasion pellets, the moist material is pelleted in an Eirich TR 04 disc pelleter. The size distribution is also set therein.

To this end, 200 g of freshly prepared granules are placed on the disc and the target particle size is set at 200-350 rpm and an inclination angle of 30-40°. When the target particle size has been established, introduction of the encapsulated pigment in portions is commenced.

Portions of between 50 and 100 g are introduced, which can be added within a short time (1 kg about 10-15 minutes). Relatively coarse aggregates collect in the center of the "material-flow kidney" formed during pelleting. These are picked up using a small shovel, comminuted manually and added again.

3.3 Drying of the Pellets

The pellets are dried in an Aeromatic Fielder, model STREA fluidized-bed dryer.

The drying time for 1.7 kg of moist material is 90-120 minutes. The drying commences when water no longer condenses on the upper vessel wall/feed air→110° C. (exhaust air about 35-45° C.).

Complete drying is subsequently carried out with a feed air of 100-110° C. (exhaust air 90-100° C.). Depending on the pellet size and moisture content, the feed-air strength has to be regulated. The moist granulated mixture is adjusted to a residual moisture content of at least 3% by weight.

3.4 Fractionation of the Dried Pellets

In order to separate coarse particles and fines from the product particles, the dried and cooled pellets are passed firstly through a coarse sieve (upper particle limit, here 1.6 mm), and the dust and fines are subsequently separated off via a fine sieve (lower particle limit, here 0.4 mm). The yield is indicated in percent by weight (based on the amount employed).

The granules obtained are abrasion-resistant, dimensionally stable and compatible as well as readily soluble in the water-borne offset overprint varnish 350081 from Weilburger Lackfabrik.

3.5 Dissolution Rate 10 g of the dried and classified granules dissolve in 90 g of deionized water with stirring at 300 rpm in <60 seconds.

Example 4

Analogously to Example 1, 614.3 g of Timiron® Starluster MP-115 (TiO$_2$/mica pigment having a particle size of 10-60 μm, Merck KGaA) are encapsulated.

Example 5

Analogously to Example 1, 614.3 g of Xirona® Caribbean Blue (TiO$_2$/SiO$_2$/TiO$_2$ multilayered pigment on mica having a particle size of 10-60 μm, Merck KGaA) are encapsulated.

Example 6

Analogously to Example 1, 614.3 g of Timiron® SuperRed (TiO$_2$/mica pigment having a particle size of 10-60 μm, Merck KGaA) are encapsulated.

Example 7

Analogously to Example 1, 614.3 g of Xirona® Indian Summer (Fe$_2$O$_3$/silicon dioxide flakes having a particle size of 5-40 μm, Merck KGaA) are encapsulated.

Example 8

Analogously to Example 1, 614.3 g of Xirona® Magic Mauve (TiO$_2$/silicon dioxide flakes having a particle size of 5-40 μm, Merck KGaA) are encapsulated.

Example 9

Analogously to Example 1, 614.3 g of Timiron® Splendid Gold (TiO$_2$/SiO$_2$/TiO$_2$ multilayered pigment on mica having a particle size of 10-60 μm, Merck KGaA) are encapsulated.

Example 10

Analogously to Example 1, 614.3 g of Ronastar™ Noble Sparks (SiO$_2$— and TiO$_2$-coated glass flakes having a particle size of 20-200 μm, Merck KGaA) are encapsulated.

Example 11

Analogously to Example 1, 614.3 g of Xirona® Kiwi Rose (TiO$_2$-coated SiO$_2$ flakes having a particle size of 5-50 μm, Merck KGaA) are encapsulated.

USE EXAMPLES

Example A1

Shimmering Foundation

| Raw material: | | INCI | [%] |
|---|---|---|---|
| Phase A | | | |
| Extender W | (1) | MICA, CI 77891 (TITANIUM DIOXIDE) | 9.00 |
| MICRONA ® Matte Yellow | (1) | MICA, CI 77492 (IRON OXIDES) | 4.00 |
| MICRONA ® Matte Red | (1) | CI 77491 (IRON OXIDES), MICA | 0.40 |
| MICRONA ® Matte black | (1) | CI 77499 (IRON OXIDES), MICA | 0.30 |
| PEARLETS with Timiron ® Starluster MP-115 analogously to Example 4 | (1) | MICA, CI 77891 (TITANIUM DIOXIDE), PVOH | 4.50 |
| RONASPHERE ® | (1) | SILICA | 5.00 |
| Phase B | | | |
| Blanose 7 HF | (2) | CELLULOSE GUM | 0.20 |
| Veegum | (3) | MAGNESIUM ALUMINUM SILICATE | 1.00 |
| Texapon K 1296 | (4) | SODIUM LAURYL SULFATE | 0.60 |
| Triethanolamine extra pure | (1) | TRIETHANOLAMINE | 0.50 |
| Titriplex III | (1) | DISODIUM EDTA | 0.25 |
| Methyl 4-hydroxybenzoate | (1) | METHYLPARABEN | 0.15 |
| 1,2-Propanediol | (1) | PROPYLENE GLYCOL | 10.90 |
| Water, demineralised | (1) | AQUA (WATER) | 42.95 |
| Phase C | | | |
| Isopropyl myristate | (4) | ISOPROPYL MYRISTATE | 8.00 |
| Liquid paraffin | (1) | PARAFFINUM LIQUIDUM (MINERAL OIL) | 3.60 |
| Crodamol SS | (5) | CETYL ESTERS | 2.60 |
| Monomuls 60-35° C. | (4) | HYDROGENATED PALM GLYCERIDES | 1.70 |
| Stearic acid | (1) | STEARIC ACID | 1.50 |
| EUSOLEX ® 6300 | (1) | 4-METHYLBENZYLIDENE CAMPHOR | 1.30 |
| EUSOLEX ® 4360 | (1) | BENZOPHENONE-3 | 0.50 |
| RonaCare ™ tocopherol acetate | (1) | TOCOPHERYL ACETATE | 0.50 |
| Magnesium stearate | (1) | MAGNESIUM STEARATE | 0.10 |
| Propyl 4-hydroxybenzoate | (1) | PROPYLPARABEN | 0.05 |

-continued

| Raw material: | | | |
|---|---|---|---|
| | | INCI | [%] |
| Phase D | | | |
| Perfume oil 200 529 | (6) | PARFUM | 0.20 |
| Euxyl K 400 | (7) | PHENOXYETHANOL, METHYLDIBROMO GLUTARONITRILE | 0.20 |

Preparation:

Melt all constituents of phase C at about 75° C. and stir until everything has melted. Initially introduce the water of phase B cold, homogenize in the Blanose using the Turrax, scatter in the Veegum and re-homogenize. Warm to 75° C. and dissolve the remaining constituents therein with stirring. Stir in the ingredients of phase A. Add phase C at 75° C. with stirring and homogenize for 2 minutes. Cool the mass to 40° C. with stirring, add phase D. Cool further to room temperature with stirring and adjust to pH 6.9-6.5 (for example citric acid solution).

Sources of Supply:
(1) Merck KGaA/Rona®
(2) Aqualon GmbH
(3) Vanderbilt
(4) Cognis GmbH
(5) Croda GmbH
(6) Fragrance Resources
(7) Schülke & Mayr GmbH Example A2

Day Cream (O/W)

| Raw material: | | | |
|---|---|---|---|
| | | INCI | [%] |
| Phase A | | | |
| Pearlets with Timiron ® SuperRed analogously to Example 6 | (1) | MICA, CI 77891 (TITANIUM DIOXIDE), PVOH | 3.00 |
| Veegum HV | (2) | MAGNESIUM ALUMINUM SILICATE | 1.00 |
| Karion F liquid | (1) | SORBITOL | 3.00 |
| Water, demineralised | | AQUA (WATER) | 58.44 |
| Methyl 4-hydroxybenzoate | (1) | METHYLPARABEN | 0.18 |
| Phase B | | | |
| Arlacel 165 VP | (3) | GLYCERYL STEARATE, PEG-100 STEARATE | 5.00 |
| Lanette O | (4) | CETEARYL ALCOHOL | 1.50 |
| Miglyol 812 | (1) | CAPRYLIC/CAPRIC TRIGLYCERIDE | 7.00 |
| Shea butter solid | (5) | BUTYROSPERMUM PARKII (SHEA BUTTER) | 2.00 |
| Cetiol SN | (4) | CETEARYL ISONONANOATE | 7.00 |
| Eutanol G | (4) | OCTYLDODECANOL | 7.50 |
| Emulgade PL 68/50 | (4) | CETEARYL ALCOHOL, CETEARYL GLUCOSIDE | 2.00 |
| Propyl 4-hydroxybenzoate | (1) | PROPYLPARABEN | 0.08 |

-continued

| Raw material: | | | |
|---|---|---|---|
| | | INCI | [%] |
| Phase C | | | |
| Fragrance 200 530 | (6) | PARFUM | 0.20 |
| Euxyl K 400 | (7) | PHENOXYETHANOL, METHYLDIBROMO GLUTARONITRILE | 0.10 |
| Dow Corning 345 | (8) | CYCLOMETHICONE | 2.00 |
| Citric acid monohydrate | (1) | CITRIC ACID | 0.00 |

Preparation:

Disperse the Veegum in the water of phase A, add the remaining raw materials, heat to 80° C. Heat phase B to 80° C., add to phase A with stirring and homogenize. Cool to 40° C. with stirring and add phase C. Cool to room temperature and adjust to pH 6.0.

Sources of Supply:
(1) Merck KGaA/Rona®
(2) Vanderbilt
(3) Uniqema
(4) Cognis GmbH
(5) H. Erhard Wagner GmbH
(6) Fragrance Resources GmbH
(7) Schülke & Mayr GmbH
(8) Dow Corning Example A3

Shower Gel

| Raw material: | | | |
|---|---|---|---|
| | | INCI | [%] |
| Phase A | | | |
| Pearlets with Xirona ® Magic Mauve analogously to Example 8 | (1) | SILICA, CI 77891 (TITANIUM DIOXIDE), PVOH, TIN OXIDE | 0.10 |
| Keltrol SFT | (2) | XANTHAN GUM | 1.10 |
| Water, demineralised | | AQUA (WATER) | 64.70 |
| Phase B | | | |
| Plantacare 2000 UP | (3) | DECYL GLUCOSIDE | 20.00 |
| Texapon ASV 50 | (3) | SODIUM LAURETH SULFATE, SODIUM LAURETH-8 SULFATE, MAGNESIUM LAURETH SULFATE, MAGNESIUM LAURETH-8 SULFATE, SODIUM OLETH SULFATE, MAGNESIUM OLETH SULFATE | 3.60 |
| Bronidox L | (3) | PROPYLENE GLYCOL, 5-BROMO-5-NITRO-1,3-DIOXANE | 0.30 |
| Perfume oil Everest 200 524 | (4) | PARFUM | 0.05 |
| Dye solution | | | |
| Phase C | | | |
| Citric acid monohydrate | (1) | CITRIC ACID | 0.15 |
| Water, demineralised | | AQUA (WATER) | 10.00 |

Preparation:

For phase A, stir the pigment into the water. Slowly scatter in the Keltrol SFT with stirring and stir until it has dissolved. Add phases B and C successively while stirring slowly until everything is homogeneously distributed. Adjust the pH to from 6.0 to 6.5.

Sources of Supply:
(1) Merck KGaA/Rona®
(2) C.P. Kelco
(3) Cognis GmbH
(4) Fragrance Resources

Example A4

Eyeliner Gel

| Raw material: | | | |
|---|---|---|---|
| | | INCI | [%] |
| Phase A | | | |
| Pearlets with Xirona ® Caribbean Blue analogously to Example 5 | (1) | SILICA, CI 77891 (TITANIUM DIOXIDE), MICA, PVOH, TIN OXIDE | 15.00 |
| Mica Black | (1) | CI 77499 (IRON OXIDES), MICA, CI 77891 (TITANIUM) | 5.00 |
| RONASPHERE ® | (1) | SILICA | 2.00 |
| Carbopol ETD 2001 | (2) | CARBOMER | 0.40 |
| Citric acid monohydrate | (1) | CITRIC ACID | 0.00 |
| Water, demineralised | | AQUA (WATER) | 60.00 |
| Phase B | | | |
| Glycerol, anhydrous | (1) | GLYCERIN | 4.00 |
| Triethanolamine extra pure | (1) | TRIETHANOLAMINE | 0.90 |
| Luviskol VA 64 powder | (3) | PVP/VA COPOLYMER | 2.00 |
| Germaben II | (4) | PROPYLENE GLYCOL, DIAZOLIDINYL UREA, METHYLPARABEN, PROPYLPARABEN | 1.00 |
| Water, demineralised | | AQUA (WATER) | 9.70 |

Preparation:

Disperse the pearlescent pigments and Ronasphere® in the water of phase A. Acidify with a few drops of citric acid in order to lower the viscosity. Scatter in the Carbopol with stirring. After complete dissolution, slowly stir in the pre-dissolved phase B and adjust the pH to 7.0-7.5.

Sources of Supply:
(1) Merck KGaA/Rona®
(2) BF Goodrich
(3) BASF AG
(4) ISP Global Technologies

Example A5

Eye Shadow Gel

| Raw material: | | | |
|---|---|---|---|
| | | INCI | [%] |
| Phase A | | | |
| Pearlets with Xirona ® Magic Mauve analogously to Example 8 | (1) | SILICA, CI 77891 (TITANIUM DIOXIDE), PVOH, TIN OXIDE | 10.00 |
| Xirona ® Indian Summer | (1) | SILICA, CI 77491 (IRON OXIDES) | 5.00 |
| Mica Black | (1) | CI 77499 (IRON OXIDES), MICA, CI 77891 (TITANIUM DIOXIDE) | 5.00 |
| RONASPHERE ® | (1) | SILICA | 3.00 |
| Carbopol ETD 2001 | (2) | CARBOMER | 0.30 |
| Citric acid monohydrate | (1) | CITRIC ACID | 0.00 |
| Water, demineralised | | AQUA (WATER) | 60.00 |
| Phase B | | | |
| Glycerol, anhydrous | (1) | GLYCERIN | 2.00 |
| Germaben II | (3) | PROPYLENE GLYCOL, DIAZOLIDINYL UREA, METHYLPARABEN, PROPYLPARABEN | 0.20 |
| Triethanolamine extra pure | (1) | TRIETHANOLAMINE | 0.70 |
| Water, demineralised | | AQUA (WATER) | 13.80 |

Preparation:

Disperse the pearlescent pigments and Ronasphere® in the water of phase A. Acidify with a few drops of citric acid in order to lower the viscosity, scatter in the Carbopol with stirring. After complete dissolution, slowly stir in the pre-dissolved phase B.

Sources of Supply:
(1) Merck KGaA
(2) BF Goodrich GmbH
(3) ISP Global Technologies

Example A6

Shampoo

| Raw material | | | |
|---|---|---|---|
| | | INCI | [%] |
| Phase A | | | |
| Pearlets with Xirona ® Caribbean Blue analogously to Example 5 | (1) | SILICA, CI 77891 (TITANIUM DIOXIDE), MICA, PVOH, TIN OXIDE | 0.05 |
| Carbopol ETD 2020 | (2) | ACRYLATES/C10-30 ALKYL ACRYLATE CROSSPOLYMER | 0.90 |
| Water, demineralised | | AQUA (WATER) | 59.90 |
| Phase B | | | |
| Triethanolamine extra pure | | TRIETHANOLAMINE | 0.90 |
| Water, demineralised | | AQUA (WATER) | 10.00 |
| Phase C | | | |
| Plantacare 2000 UP | (3) | DECYL GLUCOSIDE | 20.00 |
| Texapon ASV | (3) | MAGNESIUM OLETH SULFATE, SODIUM OLETH SULFATE, MAGNESIUM LAURETH-8 SULFATE, SODIUM LAURETH-8 SULFATE, MAGNESIUM LAURETH SULFATE, SODIUM LAURETH SULFATE | 8.00 |

-continued

| Raw material | | INCI | [%] |
|---|---|---|---|
| Bronidox L | (3) | PROPYLENE GLYCOL, 5-BROMO-5-NITRO-1,3-DIOXANE | 0.20 |
| Perfume oil Everest 79658 SB | (4) | PARFUM | 0.05 |

Preparation:

For phase A, stir the pigment into the water. Acidify with a few drops of citric acid (10%) in order to reduce the viscosity and slowly scatter in the Carbopol with stirring. After complete dissolution, slowly add phase B. The constituents of phase C are then added successively.

Sources of Supply:
(1) Merck KGaA
(2) BF Goodrich GmbH
(3) Cognis GmbH
(4) Haarmann & Reimer GmbH Example A7

Sparkling Body Cream (O/W)

| Raw material | | INCI | [%] |
|---|---|---|---|
| Phase A | | | |
| Pearlets with Timiron ® Splendid Gold analogously to Example 9 | (1) | CI 77891 (TITANIUM DIOXIDE), MICA, SILICA, PVOH | 3.00 |
| Carbopol ETD 2001 | (2) | CARBOMER | 0.60 |
| Citric acid monohydrate | (1) | CITRIC ACID | 0.00 |
| Water, demineralised | | AQUA (WATER) | 40.00 |
| Phase B | | | |
| RonaCare ™ Allantoin | (1) | ALLANTOIN | 0.20 |
| 1,2-Propanediol | (1) | PROPYLENE GLYCOL | 3.00 |
| Euxyl K 400 | (3) | PHENOXYETHANOL, METHYLDIBROMO GLUTARONITRILE | 0.10 |
| Chemag 2000 | (4) | IMIDAZOLINYL UREA | 0.30 |
| Methyl 4-hydroxybenzoate | (1) | METHYLPARABEN | 0.15 |
| Water, demineralised | | AQUA (WATER) | 27.65 |
| Phase C | | | |
| Hostaphat KL 340 N | (5) | DILAURETH-4 PHOSPHATE | 3.00 |
| Cetyl alcohol | (1) | CETYL ALCOHOL | 2.00 |
| Liquid paraffin | (1) | PARAFFINUM LIQUIDUM (MINERAL OIL) | 10.00 |
| Cetiol V | (6) | DECYL OLEATE | 6.00 |
| Propyl 4-hydroxybenzoate | (1) | PROPYLPARABEN | 0.05 |
| Phase D | | | |
| Triethanolamine | (1) | TRIETHANOLAMINE | 0.35 |
| Water, demineralised | | AQUA (WATER) | 3.50 |

-continued

| Raw material | | INCI | [%] |
|---|---|---|---|
| Phase E | | | |
| Perfume oil 72979 | (7) | PARFUM | 0.10 |

Preparation:

Disperse the pearlescent pigment in the water of phase A. If necessary, acidify with a few drops of citric acid in order to reduce the viscosity. Scatter in the Carbopol with stirring. After complete dissolution, slowly stir in the pre-dissolved phase B. Heat phase A/B and phase C to 80° C., stir phase C into phase A/B, homogenize with phase D, neutralize, re-homogenize and cool with stirring. At 40° C., add the perfume oil, cool to room temperature with stirring.

Sources of Supply:
(1) Merck KGaA
(2) BF Goodrich GmbH
(3) Schülke & Mayr GmbH
(4) Chemag AG
(5) Clariant GmbH
(6) Cognis GmbH
(7) Haarmann & Reimer GmbH Example A8

Shower Gel

| Raw material | | INCI | [%] |
|---|---|---|---|
| Phase A | | | |
| Pearlets with Ronastar ™ Noble Sparks analogously to Example 10 | (1) | CALCIUM ALUMINUM BOROSILICATE, SILICA, TITANIUM DIOXIDE, TIN OXIDE | 0.05 |
| Keltrol CG-SFT | (2) | XANTHAN GUM | 1.10 |
| Water, demineralised | | AQUA (WATER) | 64.07 |
| Phase B | | | |
| Plantacare 2000 UP | (3) | DECYL GLUCOSIDE | 20.00 |
| Texapon ASV 50 | (3) | SODIUM LAURETH SULFATE, SODIUM LAURETH-8 SULFATE, MAGNESIUM LAURETH SULFATE, MAGNESIUM LAURETH-8 SULFATE, SODIUM OLETH SULFATE, MAGNESIUM OLETH SULFATE | 3.60 |
| Bronidox L | (3) | PROPYLENE GLYCOL, 5-BROMO-5-NITRO-1,3-DIOXANE | 0.30 |
| Frag 280851 Fruit Cocktail | (4) | PARFUM | 0.05 |
| 1% Sicovit yellow orange 85 E 110 in water | (5) | AQUA (WATER), CI 15985 (FD&C YELLOW NO. 6) | 0.33 |
| 1% Sicovit quinoline yellow 70 E 104 in water | (5) | AQUA (WATER), CI 47005 (ACID YELLOW 3) | 0.35 |

-continued

| Raw material | | | |
|---|---|---|---|
| | INCI | | [%] |
| Phase C | | | |
| Citric acid monohydrate | (5) | DILAURETH-4 PHOSPHATE | 0.15 |
| Water, demineralised | (1) | AQUA (WATER) | 10.00 |

Preparation:

Disperse the granules in the water of phase A. Add the Keltrol CG-SFT with slow stirring and stir until everything has dissolved (do not homogenize). Add the components of phase B to phase A. Dissolve the citric acid in the water of phase C and add to phase A/B. Homogenize with stirring (avoid introducing air). Adjust the pH to 6.0-6.5 using citric acid if necessary.

Sources of Supply:
(1) Merck KGaA/Rona®
(2) C. P. Kelco
(3) Cognis GmbH
(4) Drom
(5) BASF AG Example A9

Soap

| Raw material | | | |
|---|---|---|---|
| | INCI | | [%] |
| Phase A | | | |
| Pearlets with Xirona ® Kiwi Rose analogously to Example 11 | (1) | SILICA, CI 77891 (TITANIUM DIOXIDE), PVOH | 1.00 |
| Colorona ® Glitter Bordeaux | (1) | MICA, CI 77941 (IRON OXIDES) | 0.33 |
| Phase B | | | |
| Translucent soap base | (2) | SODIUM PALMATE, SODIUM LAUTETH SULFATE, SODIUM SEARATE, SODIUM MYRISTATE, SODIUM COCOYL ISETHIONATE, TRIETHANOLAMINE, AQUA (WATER), GLYCERIN, SORBITOL, PROPYLENE GLYCOL, FRAGANCE | 98.67 |

Preparation:

Phase B is refined through an appropriate sieve in a soap extruder and extruded. The mass is then converted into pellets. Phase A is subsequently added and mixed homogeneously with phase B. The soap mass is re-extruded and shaped into soaps.

Sources of Supply:
(1) Merck KGaA/Rona®
(2) Jean Charles

Example A10

Sun Cream W/O

| Raw material | | | |
|---|---|---|---|
| | INCI | | [%] |
| Phase A | | | |
| Eusolex ® TS | (1) | TITANIUM DIOXIDE, ALUMINA, STEARIC ACID | 10.00 |
| Arlacel P135 | (2) | PEG-30 DIPOLYHYDROXY-STEARATE | 2.00 |
| ISO WO5 | (3) | PARAFIN | 2.50 |
| Myritol 318 | (4) | CAPRYLIC/CAPRIC TRIGLYCERIDES | 6.00 |
| Arlamol DOA | (2) | DIETHYLHEXYL ADIPATE | 6.00 |
| Arlamol E | (2) | PPG-15 STEARYLETHER | 0.70 |
| DC 345 | (5) | CYCLOMETHICONE | 1.40 |
| Shea butter | (6) | SHEA BUTTER | 1.00 |
| Isononyl isononanoate | (6) | ISONONYLE ISONONANOATE | 9.00 |
| Zinc stearate | (6) | ZINC STEARATE | 0.70 |
| RonaCare ™ Tocopheryl Acetate | (1) | TOCOPHERYL ACETATE | 0.50 |
| Bentone Gel TN | (7) | $C_{12-15}$ ALCOHOL BENZOATE, STEARALKONIUM HECTORITE, PROPYLENE CARBONATE | 7.00 |
| Phase B | | | |
| Water, demineralised | | | qsp 100 |
| Magnesium sulfate | (1) | MAGNESIUM SULFATE | 0.70 |
| Titriplex III | (1) | DISODIUM EDTA | 0.05 |
| Glycerol | | GLYCERIN | 3.00 |
| Phase C | | | |
| Eusolex ® UV-Pearls ™ OMC | (5) | AQUA, ETHYLHEXYLMETHOXY CINNAMATE, SILICA, CHLORPHENESIN, BHT | 20.00 |
| Phase D | | | |
| Pearlets with Xirona ® Caribbean Blue analogously to Example 5 | (1) | SILICA, CI 77891 (TITANIUM DIOXIDE), MICA, PVOH, TIN OXIDE | 0.20 |

Preparation:

Warm phases A and B to 75° C. Slowly stir phase B into phase A and stir vigorously. Homogenize. Allow to cool during the stirring. Add phase C at 40° C. with stirring. Disperse phase D.

Sources of Supply:
(1) Merck KGaA/Rona®
(2) Quimasso
(3) Aiglon
(4) Cognis
(5) Dow Corning
(6) Laserson
(7) Rheox

Example A11

After-sun Body Lotion

| Raw material | | INCI | [%] |
|---|---|---|---|
| Phase A | | | |
| Arlamol HD | (2) | ISOHEXADECANE | 6.30 |
| Brij 72 | (2) | STEARETH-2 | 0.70 |
| Brij 721 | (2) | STEARETH-21 | 3.90 |
| DC 200 | (5) | DIMETHICONE | 4.00 |
| Emulgade PL 68-50 | (4) | CETEARYL GLUCOSIDE, CETEARYL ALCOHOL | 0.25 |
| Cetiol SN | (4) | CETEARYL ISONONANOATE | 3.00 |
| Cetiol MM | (4) | MYRISTYL MYRISTATE | 1.50 |
| RonaCare ™ Tocopheryl Acetate | (1) | TOCOPHERYL ACETATE | 0.50 |
| Finsolv TN | (3) | $C_{12-15}$ ALCOHOL BENZOATE | 3.00 |
| RonaCare ™ Ectoin | (1) | ECTOIN | 1.00 |
| RonaCare ™ Bisabolol | (1) | BISABOLOL | 0.50 |
| Phase B | | | |
| Water, demineralised | | | qsp 100 |
| Carbopol Ultrez 10 | (1) | CARBOMER | 0.25 |
| Glycerol | | GLYCERIN | 2.00 |
| Phase C ® | | | |
| Pearlets with Xirona Caribbean Blue analogously to Example 5 | (1) | SILICA, CI 77891 (TITANIUM DIOXIDE), MICA, PVA, TIN OXIDE | 1.00 |

Preparation:

Warm phases A and B to 75° C. Slowly stir phase B into phase A and stir vigorously. Homogenize. Allow to cool during the stirring. Add phase C at 40° C. with slow stirring. Neutralise to pH=5.

Sources of Supply:
(1) Merck KGaA/Rona®
(2) Quimasso
(3) Finetex
(4) Cognis
(5) Dow Corning

Example A12

Pressure

Preparation of a Paper Coating in a Sizing Press

| Formulation | |
|---|---|
| Carboxymethylcellulose (soluble in cold water; 2% aqueous solution gives a Brookfield viscosity of 30 mPas) | 40 g/l |
| Anionic copolymer dispersion based on n-butyl acrylate, acrylonitrile and styrene; solids content: 50%; pH: 8–9; MFT (minimum film-formation temperature in accordance with DIN 53787: <1° C.) | 200 g/l |
| Antifoam based on phosphoric acid/alcohol mixture | 2 g/l |
| Pigment granules from Example 2 | 50 g/l |
| Modified melamine-formaldehyde resin (solids content: 40%; pH: about 9; ionogeneity: anionic) | 25 g/l |
| Deionized water for setting the processing viscosity | as required |
| Processing viscosity: | 150–350 mPas (Brookfield 100 rpm) |

Application rate: 450 l/t of finished paper

Example A13

Plastic 40 g of granules from Example 2 are added to 1 kg of biodegradable granules based on lactic acid (manufacturer: Stepah BV, The Netherlands; density: 1.25 g/cm³; tensile strength kpsi: 6-15; melting point: >145° C.) in a drum mixer and mixed for 2 minutes. These granules are converted into stepped platelets measuring 4×3×0.5 cm in an injection-moulding machine under the usual conditions. The platelets obtained are distinguished by pronounced luster.

Example A14

Paint

Formulation consisting of:
3.00% of pigment granules from Example 1
0.70% of Cromophtal Blue A 3R (Ciba)
0.07% of pigment-grade carbon black FW 200 (Degussa)
0.08% of Hostaperm Violet RL Special (Clariant)
Remainder: water-borne basecoat with a solids content of 17% (acrylate/melamine) and deionized water.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An encapsulated pigment comprising an outer water-soluble shell, said shell comprising a water-soluble film former of polyvinyl alcohol (PVOH) encapsulating a core, said core comprising at least one effect pigment which is a pearlescent pigment or a multilayered pigment based on $SiO_2$ flakes, glass flakes, or $TiO_2$ flakes, and, optionally, one or more solvents and/or conventional additives.

2. An encapsulated pigment according to claim 1, wherein the outer shell consists of the water-soluble film former.

3. An encapsulated pigment according to claim 1, wherein the shell/core weight ratio is from 50:50 to 0.5:99.5.

4. An encapsulated pigment of claim 1, wherein the % weight of the core is >80% based on the total weight of the encapsulated pigment.

5. An encapsulated pigment according to claim 1, wherein the dissolution rate of the shell in de-ionized water stirred at 300 rpm and at room temperature is <60 seconds.

6. An encapsulated pigment according to claim 1, wherein the core comprises at least one pearlescent pigment which is based on a $TiO_2$- and/or $Fe_2O_3$-coated mica flake, glass flake, $Al_2O_3$ flake or $SiO_2$ flake.

7. An encapsulated pigment according to claim 1, wherein the core comprises at least one pearlescent pigment which has a $TiO_2$—$SiO_2$—$TiO_2$ layer sequence.

8. An encapsulated pigment according to claim 1, wherein the core further comprises at least one additive which is an antifoam agent, surface-active substance, wetting agent, anti-settling agent, preservative, UV stabilizer, flow-control agent, neutralizer, modifier, siccative or thixotropic agent.

9. A paint, coating, powder coating, printing ink, paper-making, paper coating, security printing ink, plastic or cosmetic composition comprising an encapsulated pigment of claim 1 and water.

10. An encapsulated pigment of claim 1, wherein the shell/core weight ratio is from 10:90 to 5:95.

11. An encapsulated pigment of claim 1, wherein the outer water-soluble shell has a thickness of 0.01-1.0 mm.

12. An encapsulated pigment according to claim 1, wherein the water-soluble film former has an acid number of from 120 to 280 mg of KOH/g.

13. An encapsulated pigment of claim 1, wherein the outer water-soluble shell is provided such that when 10 g of the encapsulated pigment is provided in 90 g of de-ionized water at room temperature with stirring at 300 rpm, the shell will dissolve within one minute.

14. An encapsulated pigment according to claim 1, wherein the film former is a polyvinyl alcohol (PVOH), which has the following properties:
  ester value in accordance with DIN 53401 in mg of KOH/g =1-250,
  degree of hydrolysis in mol %=80-100,
  viscosity in accordance with DIN 53015 in mPas=2-60,
  residual acetyl content=0.1-20, and
  ash content in %, calculated as $Na_2O$=0.5-1.

15. An encapsulated pigment according to claim 1, wherein the water-soluble film former has an acid number of from 90 to 350 mg of KOH/g.

16. An encapsulated pigment comprising an outer water-soluble shell, said shell comprising a water-soluble film former having an acid number of from 90 to 350 mg of KOH/g, encapsulating a core, said core comprising at least one organic and/or inorganic pigment and, optionally, one or more solvents and/or conventional additives, wherein the outer water-soluble shell has a thickness of 0.01-1.0 mm.

* * * * *